UNITED STATES PATENT OFFICE.

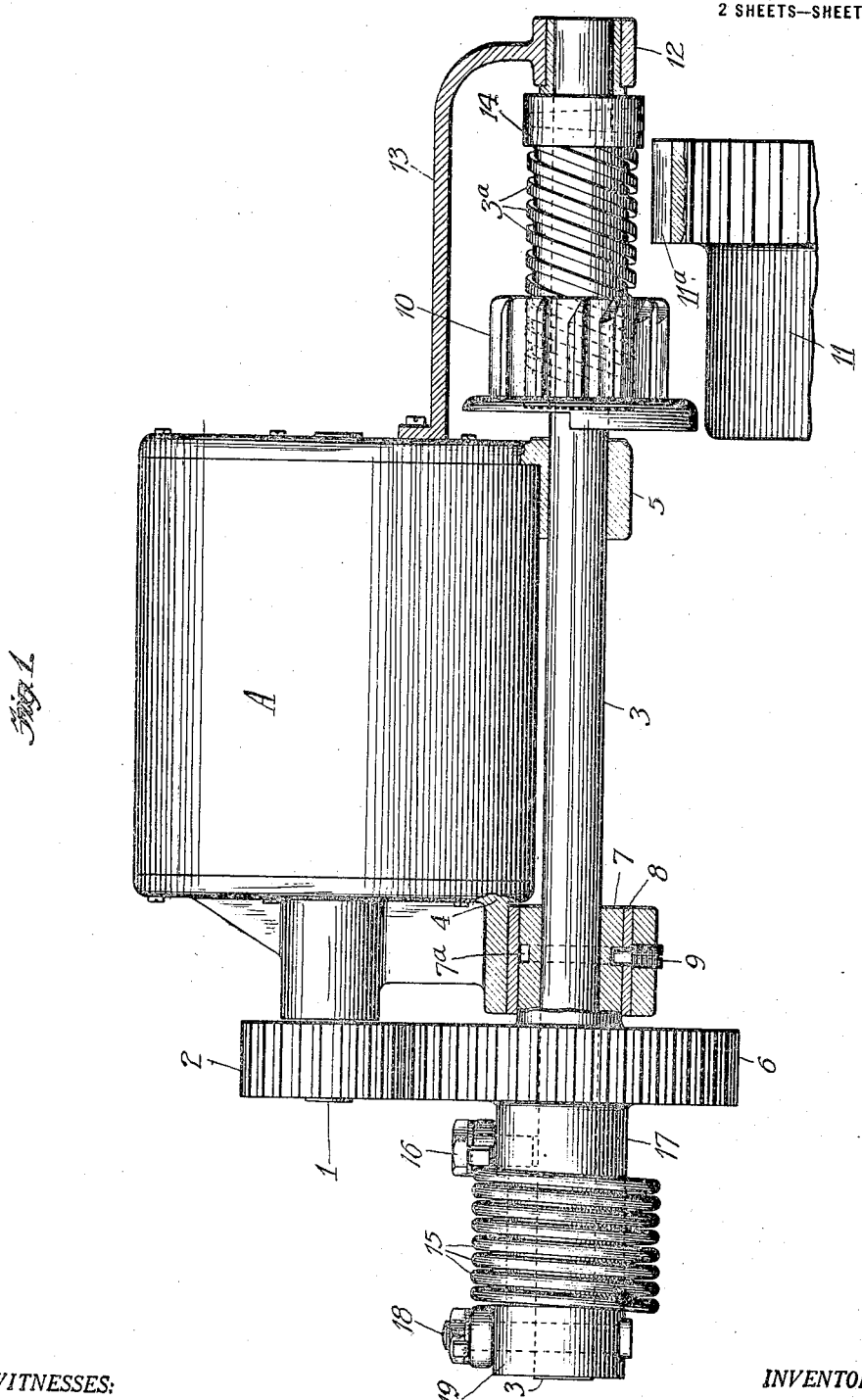

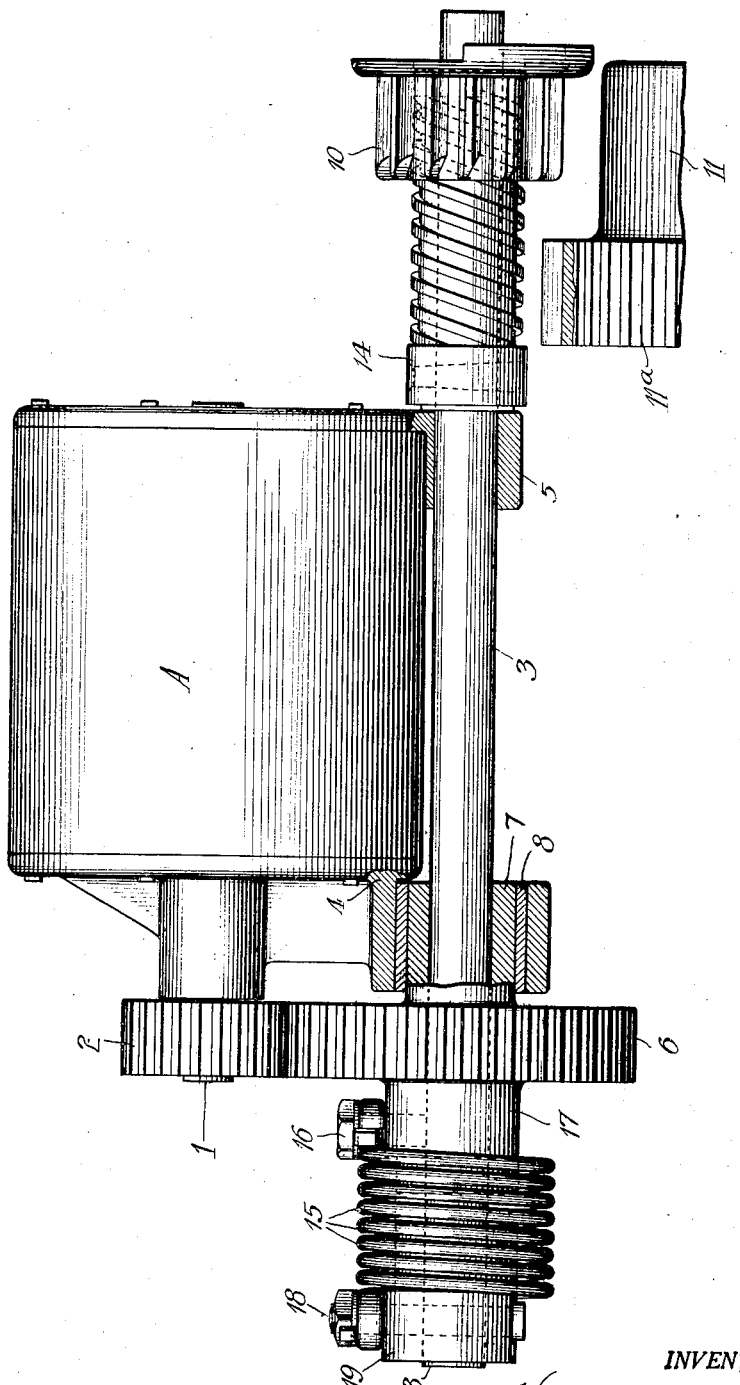

VINCENT BENDIX, OF CHICAGO, ILLINOIS.

ENGINE-STARTER.

1,359,954.   Specification of Letters Patent.   Patented Nov. 23, 1920.

Application filed November 25, 1916. Serial No. 133,488.

*To all whom it may concern:*

Be it known that I, VINCENT BENDIX, a citizen of the United States, residing at Chicago, in the county of Cook and State of Illinois, have invented certain new and useful Improvements in Engine-Starters, of which the following is a specification.

My invention relates to a starter for an engine, more particularly a gas engine or the like, and pertains to the transmission or drive between a prime mover, such as an electric motor, and a part of the engine to be started, such as the fly-wheel thereof. This transmission or drive is exemplified in patents heretofore issued to me, for instance Patents No. 1,125,935, dated January 26, 1916, and No. 1,146,992, dated July 20, 1915, and such transmission is characterized by the employment of a screw shaft operated by a motor and a pinion screw-threaded upon the shaft and adapted to travel longitudinally in one direction along the shaft into engagement with the fly-wheel or other rotary member of the engine to be started and to travel longitudinally in the opposite direction along the shaft after being automatically thrown out of engagement with the engine member when the engine begins to run on its own power.

The object of my present invention is to provide a simple and efficient construction of transmission of this general type and of the special class in which a double reduction is provided between the motor and the screw-shaft.

In the drawings Figure 1 is a sectional elevation of a transmission embodying my invention and Fig. 2 a similar view but illustrating a modified form of construction.

Referring to the embodiment of my invention as illustrated in Fig. 1, the starting motor shown at A is in the form of an electric motor and the same is provided with an extended armature shaft 1 to which is secured a driving pinion 2. The screw shaft 3 is suitably mounted adjacent the motor and by preference the same is mounted for both rotary and longitudinal movement in the motor casing itself by means of the bearings 4 and 5. Upon this shaft is loosely mounted a gear 6 through which the shaft passes and with respect to which it has a limited longitudinal movement. This gear which meshes with the pinion 2 and is driven thereby, is provided with a laterally extending hub 7 which is received within the bearing 4, a bushing 8 being preferably interposed between such bearing and the hub. In order to prevent lateral movement of the gear the hub is provided with a circumferential groove $7^a$ into which fits the inner end of a set screw 9 passing through the bearing 4 and bushing 8 and into such groove.

The screw-shaft is provided with screw threads only near one end, that is the right-hand end, as shown in Fig. 1, where the screw threads are indicated at $3^a$, the remaining portion of the shaft being plain. Upon these threads is screw-threaded a pinion 10 which is adapted to mesh with the teeth $11^a$ of a fly-wheel indicated at 11. The outer right-hand end of the shaft is mounted in a bearing 12 at the outer end of a suitable bracket 13 which is here shown as attached to the motor casing. To limit the outward movement of the pinion 10 a stop nut 14 secured to the screw shaft is provided.

The other end of the screw-shaft extends beyond the gear 6 and thereat a resilient driving connection is provided, between the gear 6 and such shaft. This driving connection comprises a coiled spring 15 anchored at one end to a bolt 16 screwing into the hub 17 of the gear 6 and anchored at its other end to a bolt 18 passing through a collar 19 and through the extreme outer end of the shaft 3. Thus the power is transmitted from the motor through the pinion 2, gear 6, hub 17, bolt 16, spring 15, and bolt 18 and collar 19 to the screw-shaft.

Describing the mode of operation and starting with the parts in their normal position shown, when the motor is operated the screw-shaft 3 will be rotated, whereupon the pinion will be advanced to the right into mesh with the fly-wheel gear and when stopped by the nut 14 it will rotate the fly-wheel. When the engine starts on its own power the pinion will be automatically de-meshed and returned to normal position.

In the event that the pinion teeth and the fly-wheel teeth should abut end to end, the screw-shaft 3 will yield longitudinally toward the left against the tension of the coiled spring 15, but when the pinion moves slightly rotarily and meshing takes place, the screw-shaft is restored to its normal position longitudinally by such spring.

In Fig. 2 I have shown a modified form of construction according to which the pinion moves inwardly toward the motor in the meshing operation instead of away therefrom as in Fig. 1, with the result that the screw-shaft will move longitudinally toward the right in the event of the abutting of the pinion and fly-wheel teeth end to end. Otherwise the construction is the same and consequently the same reference figures will apply to corresponding parts. In the modified form of construction the outboard bearing 12 is dispensed with because of the inward movement of the pinion in the meshing operation. It will be understood that this pinion is stopped in its outward movement in Fig. 2 and in its inward movement in Fig. 1 by suitable stops such as the abrupt termination of the threads as set forth in my prior Patent No. 1,134,975, dated April 6, 1915.

As herein shown, the drive or transmission mechanism is supported by the motor frame. By preference, this frame is composed of a central body or casing and removable end heads secured thereto, on which heads respectively the bearings 4 and 5 are formed.

I claim:

1. In a device of the character described, the combination, with a prime mover, of a rotatable member, a driving member mounted thereon toward one end thereof for rotary movement therewith and longitudinal movement thereof, reduction gearing between the prime mover and the rotatable member including a gear loosely mounted on such latter member intermediate its length and toward the other end thereof, and a yielding driving connection located at such latter end of the rotatable member and connecting between the gear and such member.

2. In a device of the character described, the combination, with a prime mover, of a rotatable member, a driving member mounted thereon toward one end thereof for rotary movement therewith and longitudinal movement thereof, reduction gearing between the prime mover and the rotatable member including a gear loosely mounted on such latter member toward the other end thereof, and a yielding driving connection located at such latter end of the rotatable member and connecting between the gear and such member, said rotatable member being mounted for longitudinal movement against the tension of such yielding driving connection.

3. In a device of the class described, the combination, with a motor and driving shaft, of a rotatable screw shaft supported by the opposite ends of the motor for endwise movement therein and arranged parallel to the driving shaft, a pinion screw-threaded on the screw shaft for rotary movement therewith and longitudinal movement thereof, and a driving connection between the motor shaft and the screw shaft.

4. In a device of the class described, the combination, with a motor and driving shaft, of a rotatable screw shaft supported by the opposite ends of the motor and arranged parallel to the driving shaft, said screw shaft being mounted for endwise movement, a pinion screw-threaded on the screw shaft for rotary movement therewith and longitudinal movement thereof, and a driving connection between the motor shaft and the screw shaft, comprising a pinion on the driving shaft and a gear on the screw shaft meshing with the pinion.

5. In a device of the class described, the combination, with a motor and driving shaft, of a rotatable screw shaft supported at opposite ends of the motor thereby, a pinion screw-threaded thereon for rotary movement therewith and longitudinal movement thereof, and a driving connection between the motor shaft and the screw shaft, comprising a pinion on the driving shaft, a gear loosely mounted on the screw shaft meshing with the pinion, said screw shaft being mounted for endwise movement, and a yielding driving connection between the gear and the screw shaft.

6. In a device of the class described, the combination, with a motor and driving shaft, of a rotatable screw shaft supported thereby, a pinion screw-threaded thereon for rotary movement therewith and longitudinal movement thereof, and a driving connection between the motor shaft and the screw shaft, comprising a pinion on the driving shaft, a gear loosely mounted on the screw shaft and adapted to mesh with the last mentioned pinion, said screw shaft being mounted for endwise movement in such gear, and a spring driving connection between the gear and the screw shaft.

7. In a device of the class described, the combination, with a motor and driving shaft, of a rotatable screw shaft supported thereby, a pinion screw-threaded thereon for rotary movement therewith and longitudinal movement thereof, and a driving connection between the motor shaft and the screw shaft, comprising a pinion on the driving shaft, a gear loosely mounted on the screw shaft meshing with the pinion, and a spring driving connection between the gear and the screw shaft, said screw shaft having a yielding longitudinal movement resisted by the spring.

8. In a device of the class described, the combination, with a motor and driving shaft, of a rotatable screw shaft supported thereby, a pinion screw-threaded thereon for rotary movement therewith and longitudinal movement thereof, and a driving connection between the motor shaft and the screw shaft, comprising a pinion on the driving shaft, a gear loosely mounted on the screw shaft meshing with the pinion, said screw shaft having a yielding longitudinal movement, means for preventing lateral movement of the gear on the screw shaft, and a yielding driving connection between the gear and the screw shaft.

9. In a device of the class described, the combination, with a motor and driving shaft, of a rotatable screw shaft supported thereby, a pinion screw-threaded thereon for rotary movement therewith and longitudinal movement thereof, and a driving connection between the motor shaft and the screw shaft, comprising a pinion on the driving shaft, a gear loosely mounted on the screw shaft meshing with the pinion, said screw shaft having a yielding longitudinal movement, said gear having on one side a hub and the motor having a bearing receiving the same, and means retaining the hub in the bearing but permitting the rotation thereof, and a yielding driving connection between the gear and the screw shaft.

10. In a device of the class described, the combination, with a motor and driving shaft, of a rotatable screw shaft supported thereby, a pinion screw-threaded thereon for rotary movement therewith and longitudinal movement thereof, and a driving connection between the motor shaft and the screw shaft, comprising a pinion on the driving shaft, a gear loosely mounted on the screw shaft meshing with the pinion, said screw shaft having a yielding longitudinal movement, said gear having on one side a hub and the motor having a bearing receiving the same, and means for retaining the hub in the bearing but permitting the rotation thereof, said gear having a hub on its opposite side, a coiled spring anchored at one end to the latter hub and at its other end to the screw shaft.

11. In a device of the class described, the combination, with a motor and driving shaft, of a rotatable screw shaft supported thereby, a pinion screw-threaded thereon for rotary movement therewith and longitudinal movement thereof, and a driving connection between the motor shaft and the screw-shaft, comprising a pinion on the driving shaft, a gear loosely mounted on the screw shaft meshing with the pinion, said screw shaft having a yielding longitudinal movement, said gear having on one side a hub and the motor having a bearing receiving the same, and means for retaining the hub in the bearing but permitting the rotation thereof, and a yielding driving connection between the gear and the screw shaft, said driving connection being located at one end of the screw shaft and on one side of the motor and the pinion being located at the other end thereof and on the other side of the motor.

12. In a device of the class described, the combination, with a motor and driving shaft, of a rotatable screw shaft supported thereby, a pinion screw-threaded thereon for rotary movement therewith and longitudinal movement thereof, and a driving connection between the motor shaft and the screw shaft, comprising a pinion on the driving shaft, a gear loosely mounted on the screw shaft meshing with the pinion, the motor having a casing provided with bearings, and the screw shaft being mounted therein for rotary movement and longitudinal movement, and a yielding driving connection between the gear and the screw shaft.

13. In a device of the character described, the combination of a rotatable member, a driving member mounted thereon for rotary movement thereon and longitudinal movement thereof, a driving gear mounted on said rotatable member intermediate its length, and a yielding driving connection between said gear and the rotatable member, said connection being arranged on one side of the gear and the driving member on the other side thereof.

14. In a device of the character described, the combination of a screw shaft, a pinion mounted thereon for rotary movement thereon and longitudinal movement thereof, a driving gear loosely mounted on said shaft intermediate its length, and a yielding driving connection between said gear and shaft, said connection being arranged on one side of the gear and the pinion on the other side thereof.

15. In a device of the character described, the combination, with a motor and driving shaft, of a rotatable member mounted parallel to the driving shaft and extending beyond the ends of the motor, a driving member mounted thereon at one end of the motor for rotary movement therewith and longitudinal movement thereof, and operating connections including a yielding driving device between the rotatable member and the driving shaft at the other end of the motor, said member being mounted for endwise movement against the tension of such yielding driving device.

16. In a device of the class described, the combination of a motor having a driving shaft and a frame provided with opposite end heads, and power transmitting means including a rotatable driving shaft arranged parallel to the driving shaft of said motor and journaled in said end heads and having an endwise movement therein, and an operating connection between the two shafts, including inter-meshing gears on the two shafts, the gear on said driving shaft being loosely mounted thereon and having a yielding driving connection therewith.

17. In a device of the class described, the combination of a motor having a driving shaft and a frame provided with end heads, and power transmitting means including a rotatable driving shaft arranged parallel to the driving shaft of said motor and journaled in said end heads, an operating connection between the two shafts at one end of the driving shaft, and means on the other end of the latter shaft for engagement with a part of the engine to be started, said driving shaft being mounted for limited endwise movement so as to yield when such engaging means abuts said engine part instead of engaging therewith.

VINCENT BENDIX.